A. PRESS.
BRUSH FOR DYNAMO ELECTRIC MACHINES.
APPLICATION FILED MAR. 17, 1906.
1,028,964.
Patented June 11, 1912.
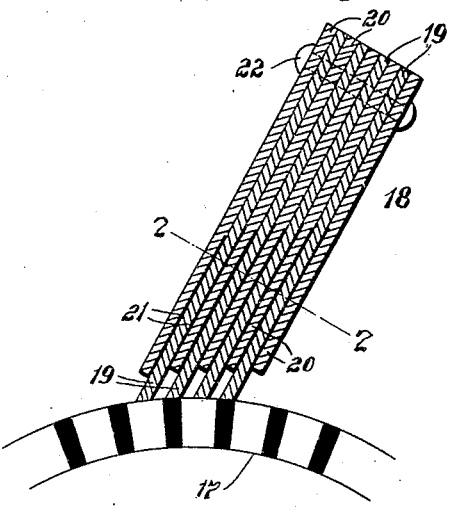
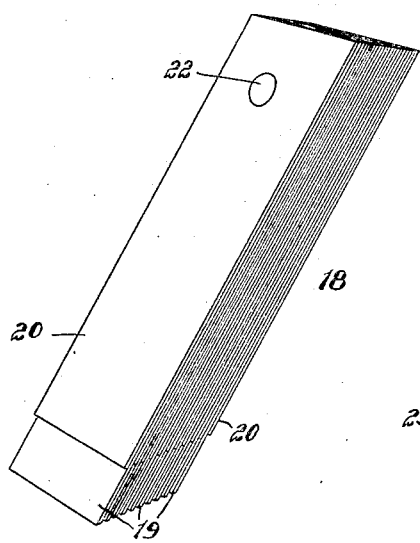
WITNESSES:
George J. Schwartz
Fred J. Kinsey
INVENTOR:
Abraham Press.
BY
Chas. E. Lord
ATTORNEY

UNITED STATES PATENT OFFICE.

ABRAHAM PRESS, OF NORWOOD, OHIO, ASSIGNOR TO THE BULLOCK ELECTRIC MANUFACTURING COMPANY, A CORPORATION OF OHIO.

BRUSH FOR DYNAMO-ELECTRIC MACHINES.

1,028,964.

Specification of Letters Patent. Patented June 11, 1912.

Application filed March 17, 1906. Serial No. 306,554.

*To all whom it may concern:*

Be it known that I, ABRAHAM PRESS, a citizen of the United States, residing at Norwood, in the county of Hamilton and State of Ohio, have invented certain new and useful Improvements in Brushes for Dynamo-Electric Machines, of which the following is a full, clear, and exact specification.
My invention relates to brushes for dynamo-electric machines.

The object of my invention is to provide a brush by means of which commutation sparking can be very much reduced, especially in high speed machines in which sparking has heretofore presented a very difficult problem.

When a brush is commutating, the short-circuited coil tends to send excessive currents through the brush. If the coil possesses considerable magnetic inertia, due to self induction, the change of current in the coil is not gradual and proportionate to the contact areas of the brush and commutator bar. Instead of a gradual and proportionate change taking place, the current of the short-circuited coil tends to persist in the same direction causing inordinate increases of current density in the brush surface area.
Therefore the reactance of the armature coils and leads should be as small as possible, and since the commutator bars are in reality the ends of the armature coils, the bars should be made of low reactance material. Again since the short-circuited coil is usually in a magnetic field, an alternating electro-motive force may be generated in the coil causing excessive current densities in the brush. The currents in a brush of a direct current machine consist therefore of several components,—a direct current and one or more alternating currents, and since commutation usually takes place in a machine at a very rapid rate these alternating currents are of very high frequencies. If there is a reactance in the commutator brushes external to the commutated coil, which reactance has no effect on the direct current, these extra and pernicious currents which are the cause of sparking can be avoided.

In carrying out my invention, I provide a commutating brush which has a high reactance, and therefore offers a high resistance or choking effect to the variable or alternating currents which normally pass through the brush when a coil is short-circuited, but offers little resistance to a direct current.

In the preferred embodiment of my invention I employ a current carrying material having a large skin effect and therefore considerable inherent reactance, and artificially increase the reactance by surrounding or partially surrounding the current carrying portion with magnetic material such as iron.

More specifically considered my invention consists of a brush constructed of alternately arranged long current carrying laminæ and short laminæ of magnetic material, the laminæ being insulated from each other, at least for a portion of their length, whereby the short laminæ, which practically surround the long laminæ, increase the reactance of the brush, to a very great extent.

My invention still further consists in the details of construction and combinations of elements described in the specification and set forth in the appended claims.

For a better understanding of my invention reference is had to the accompanying drawing forming a part of this application, in which—

Figure 1 shows a portion of a commutator, and a brush embodying my invention, the parts being exaggerated out of their true proportions; Fig. 2 is a section on the line 2—2 of Fig. 1; Fig. 3 is a perspective of a brush made in accordance with my invention; and Fig. 4 is a section through a modified form of the brush.

In the arrangement shown in Figs. 1 and 2, there is a commutator 17 on which bears the laminated brush 18. This brush consists of alternately arranged current carrying laminæ 19 adapted to engage the commutator, and shorter reactance or impedance-increasing laminæ 20. The laminæ 19 may be of metal and are preferably of iron in which the inherent reactance due to the skin effect is very great. The shorter laminæ 20 are of magnetic material having a high magnetic conductivity such as iron, and are insulated from the main current carrying laminæ, at least for a portion of their length, as is shown at 21. If desired the laminæ may be insulated from each other a greater extent than shown. One or more rivets 22 are preferably employed for holding the laminæ together. As is shown in Fig. 2 the laminæ 20 are of the same width as the current carrying laminæ 19, and hence the latter are almost entirely surrounded by the former, the lower portions and edges only of the laminæ 19 being exposed.

The function of the shorter magnetic laminæ 20 is to increase the reactance of the brush, which reactance chokes down the alternating or pulsating currents normally in a brush while a coil is undergoing commutation. These currents due to the self-induction of the coil and to the generation of electro-motive force by the coil cutting lines of force of the main field, cause sparking. Since the current carrying laminæ 19 are surrounded except at their edges by the laminæ 20 of magnetic material, practically the only paths for the high frequency currents are at the outer edges of the laminæ. It is seen that the higher the speed of rotation, the higher is the frequency of the alternating currents and hence the greater the reactance of the brush or the choking action to the currents which normally cause sparking. As was stated above, the current carrying laminæ 19 are preferably made of iron on account of the inherent reactance due to the skin effect. If desired, however, other material such as copper can be used for this purpose, in which case the shorter magnetic laminæ 20 would still be employed.

In Figs. 1 and 2 the proportions have been exaggerated to more clearly show the construction and function of the parts.

In Fig. 3 is shown a perspective of a brush in which the parts are more nearly in their true proportions.

If desired the current-carrying laminæ of the brush may be entirely surrounded by the magnetic material as is shown in Fig. 4. In this figure each current carrying laminæ 23 is entirely surrounded by a shield of magnetic material 24.

A brush constructed according to my invention is very serviceable for high speeds of rotation. Since the speeds of direct current machines have been limited by the difficulties of commutation such as sparking, brushes constructed according to my invention are especially useful for direct current turbo-generators.

I do not desire to be limited to the exact materials used nor to the exact details of construction since many changes can be made without departing from the spirit and scope of my invention.

What I claim as new and desire to secure by Letters Patent is:—

1. A brush for dynamo-electric machines comprising a plurality of current carrying laminæ and a plurality of laminæ of magnetic material, said current carrying laminæ and magnetic laminæ being alternately arranged.

2. A brush for dynamo-electric machines comprising a member having a large inherent reactance, and means associated therewith for intensifying the reactance of said member.

3. A brush for dynamo-electric machines comprising a conducting member having a large skin effect and one or more members of magnetic material adjacent thereto.

4. A brush for dynamo-electric machines comprising a strip of magnetic material and a metallic strip having a high magnetic permeability on each side thereof.

5. A brush for dynamo-electric machines comprising a plurality of alternately arranged current conducting iron laminæ and reactance iron laminæ, only the former laminæ extending to the commutator end of the brush.

6. In a brush, a plurality of current conducting laminæ and a plurality of shorter laminæ of magnetic material, said laminæ being alternately arranged.

7. In combination, a plurality of alternately arranged current conducting laminæ and laminæ of magnetic material, said laminæ being insulated from one another for at least a portion of their length.

8. In combination, a commutator, a current carrying member adapted to engage the commutator and a plurality of shorter members of magnetic material, said members being insulated from one another at the commutator end.

9. A brush comprising a group of iron laminæ adapted to engage a commutator, and a plurality of iron laminæ shorter than the first named laminæ and arranged intermediate thereof, said laminæ being insulated from one another for at least a portion of their length.

10. A brush comprising a group of alternately arranged long and short iron laminæ, the long laminæ only being adapted to engage a commutator, said laminæ being insulated from one another for at least a portion of their length, and means for holding all said laminæ together.

11. As an article of manufacture, a brush for dynamo-electric machines consisting of a plurality of iron laminæ.

12. A brush for dynamo-electric machines, comprising conducting strips insulated from one another at the commutator end, and magnetic material adjacent to said strips.

13. In combination, a commutator, and a brush comprising a group of interconnected conducting strips insulated from one another at the end adjacent to the commutator and magnetic material adjacent to said strips.

14. In combination, a commutator, and a brush comprising a group of interconnected conducting strips of magnetic material insulated from one another at the commutator end, said strips being so arranged that less than all of them bear upon the commutator.

15. A brush for dynamo-electric machines, comprising a plurality of current conducting portions which are in parallel for currents from the armature to the outside circuit and at times are in series for currents which flow in short-circuited coils of the armature, and magnetic material between said portions.

16. In a brush for dynamo-electric machines, a plurality of current carrying portions connected at points remote from the commutator end of the brush and insulated at the commutator end of the brush, said portions being of magnetic material, and a plurality of pieces of magnetic material arranged alternately with said current carrying portions at the commutator end of the brush.

17. In a brush for dynamo-electric machines, a plurality of current carrying portions connected at points remote from the commutator end of the brush and insulated at the commutator end of the brush, said portions being of magnetic material, and a plurality of members of magnetic material interspersed among said current carrying portions at the commutator end of the brush.

In testimony whereof I affix my signature in the presence of two witnesses.

ABRAHAM PRESS.

Witnesses:
  ARTHUR F. KWIS,
  FRED. J. KINSEY.